United States Patent
Bauck Irmann-Jacobsen et al.

(10) Patent No.: US 10,161,554 B2
(45) Date of Patent: Dec. 25, 2018

(54) ACTIVE CONTROL OF SUBSEA COOLERS

(71) Applicant: FMC Kongsberg Subsea AS, Kongsberg (NO)

(72) Inventors: Tine Bauck Irmann-Jacobsen, Hvalstad (NO); Erik Baggerud, Jar (NO); Brian R. Gyles, Asker (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 629 days.

(21) Appl. No.: 14/403,555

(22) PCT Filed: Apr. 18, 2013

(86) PCT No.: PCT/EP2013/058106
§ 371 (c)(1),
(2) Date: Nov. 24, 2014

(87) PCT Pub. No.: WO2013/174584
PCT Pub. Date: Nov. 28, 2013

(65) Prior Publication Data
US 2015/0176743 A1    Jun. 25, 2015

(30) Foreign Application Priority Data
May 24, 2012   (NO) .................................. 20120615

(51) Int. Cl.
*F28F 27/00* (2006.01)
*F16L 53/00* (2018.01)
*F28F 27/02* (2006.01)
*F28D 1/02* (2006.01)
*F17D 3/00* (2006.01)
*F16L 53/30* (2018.01)
*F28D 7/08* (2006.01)

(52) U.S. Cl.
CPC ............. *F16L 53/001* (2013.01); *F16L 53/30* (2018.01); *F17D 3/00* (2013.01); *F28D 1/022* (2013.01); *F28F 27/00* (2013.01); *F28F 27/02* (2013.01); *F28D 7/082* (2013.01); *F28F 2250/06* (2013.01)

(58) Field of Classification Search
CPC ................................ F28D 1/022; F28F 27/00
USPC .................................................. 165/143, 144
See application file for complete search history.

(56) References Cited

U.S. PATENT DOCUMENTS

| | | | | |
|---|---|---|---|---|
| 2,219,673 A | * | 10/1940 | Zenner | F17C 9/02 165/143 |
| 2,476,837 A | * | 7/1949 | Cline | F01P 3/20 123/41.08 |
| 2,611,587 A | * | 9/1952 | Boling | F25B 39/02 165/141 |
| 2,658,358 A | * | 11/1953 | Boling | F25B 39/04 165/143 |

(Continued)

FOREIGN PATENT DOCUMENTS

GB          1 439 178      6/1976
WO    WO 2010/110676 A2  *  9/2010

*Primary Examiner* — Ljiljana Ciric (57) ABSTRACT

A cooler system has at least first and second coolers which are arranged in series, at least a third cooler which is arranged in parallel with the first and second coolers, and at least one flow control device for directing a fluid flow through at least one of the coolers. At least one of the coolers includes a bypass circuit or a recirculation loop for the fluid flow.

11 Claims, 5 Drawing Sheets

(56) References Cited

U.S. PATENT DOCUMENTS

| | | | | |
|---|---|---|---|---|
| 2,729,976 | A * | 1/1956 | Laub | G01F 1/6847 73/204.16 |
| 2,876,630 | A * | 3/1959 | Boling | F25B 47/022 165/140 |
| 3,235,000 | A * | 2/1966 | Jacobs | F24F 3/06 165/143 |
| 3,236,297 | A * | 2/1966 | Costes | F22B 1/023 122/406.1 |
| 3,439,738 | A * | 4/1969 | Wasil | F28D 7/16 138/115 |
| 3,833,059 | A | 9/1974 | Sisson | |
| 4,028,884 | A * | 6/1977 | Martz | F01K 23/108 60/39.182 |
| 4,031,404 | A * | 6/1977 | Martz | F01K 23/108 122/479.1 |
| 4,057,034 | A * | 11/1977 | Farquhar | F22D 11/006 122/382 |
| 4,232,729 | A * | 11/1980 | Ingram | F28D 7/08 165/122 |
| 4,323,114 | A * | 4/1982 | Corey | B01D 1/10 122/32 |
| 4,368,775 | A * | 1/1983 | Ward | F01P 3/00 137/334 |
| 4,455,614 | A * | 6/1984 | Martz | F01K 23/10 290/40 R |
| 4,814,044 | A * | 3/1989 | Hitt | B01D 1/04 137/202 |
| 5,148,858 | A * | 9/1992 | Ovretveit | F28D 21/0012 165/103 |
| 5,271,454 | A * | 12/1993 | Leidinger | B64G 1/50 165/110 |
| 6,205,811 | B1 * | 3/2001 | d'Alencon | B01D 3/007 62/185 |
| 6,382,310 | B1 * | 5/2002 | Smith | F28B 1/06 165/121 |
| 7,069,984 | B2 * | 7/2006 | Jeong | F25B 25/005 165/206 |
| 8,418,487 | B2 * | 4/2013 | King | F28F 27/00 62/118 |
| 8,939,197 | B2 * | 1/2015 | Yang | F28D 20/0052 165/244 |
| 9,250,636 | B2 * | 2/2016 | Chainer | G06F 1/206 |
| 9,897,400 | B2 * | 2/2018 | Yang | F28F 27/02 |
| 2002/0003037 | A1 * | 1/2002 | Cousineau | B23Q 11/126 165/278 |
| 2004/0251017 | A1 * | 12/2004 | Pillion | F28D 7/08 165/289 |
| 2007/0289732 | A1 * | 12/2007 | Pillion | F28D 7/024 165/289 |
| 2008/0128134 | A1 * | 6/2008 | Mudunuri | C10G 1/02 166/302 |
| 2008/0149080 | A1 | 6/2008 | Reuss et al. | |
| 2009/0101122 | A1 | 4/2009 | Kurtz et al. | |
| 2011/0056674 | A1 * | 3/2011 | Campbell | H05K 7/2079 165/247 |
| 2011/0195652 | A1 * | 8/2011 | Smith | H05K 7/20836 454/184 |
| 2011/0201699 | A1 * | 8/2011 | Lucas | C07C 29/1518 518/702 |
| 2012/0103621 | A1 * | 5/2012 | Kanstad | E21B 36/001 166/344 |
| 2012/0168142 | A1 * | 7/2012 | Hernandez | E21B 36/001 165/279 |
| 2012/0257970 | A1 * | 10/2012 | Akashi | F28D 1/022 416/95 |
| 2013/0333640 | A1 * | 12/2013 | Kardos | F02B 29/0443 123/41.1 |
| 2014/0076292 | A1 * | 3/2014 | Gaiser | F28F 1/24 123/568.12 |
| 2014/0076293 | A1 * | 3/2014 | Gaiser | F28F 27/00 123/568.12 |
| 2014/0124190 | A1 * | 5/2014 | Campbell | H05K 7/20281 165/296 |
| 2015/0004552 | A1 * | 1/2015 | Kang | C03B 5/2353 432/180 |
| 2015/0094893 | A1 * | 4/2015 | Hopkirk | F02D 29/02 701/22 |
| 2015/0101334 | A1 * | 4/2015 | Bond | F28F 9/013 60/728 |
| 2015/0176928 | A1 * | 6/2015 | Tabuchi | G05D 23/1393 165/96 |
| 2015/0354849 | A1 * | 12/2015 | Matsuo | F28F 27/00 62/79 |
| 2016/0109196 | A1 * | 4/2016 | Qiu | F28F 27/02 165/296 |

* cited by examiner

ACTIVE CONTROL OF SUBSEA COOLERS

FIELD OF THE INVENTION

The invention regards a cooler system comprising at least a first and a second cooler arranged in a series connection, and a third cooler arranged in parallel with said first and second coolers. At least one of said coolers comprises a recirculation loop. The system is specifically applicable for subsea use.

BACKGROUND OF THE INVENTION

Coolers in general are well known in the art, but there are less known subsea coolers. Examples of subsea coolers, cooling a well flow such as a hydrocarbon flow, are disclosed in for example the applicant's own published application WO 2011008101 A1, which is hereby incorporated by reference in its whole, or in Norwegian patent NO 330761 B1. Other known subsea coolers are described in WO 2010110674 A2 and WO 2010110676 A2.

A compressor's function is in part dependent on the flow rate and the temperature of the medium that is to be compressed. It has been proved that cooling the medium increases the efficiency of the compressor. The need for a robust and fully-working compressor with minimum maintenance needs has proved especially important in subsea applications because of the difficulty in access with regards to remoteness and the harsh subsea environment. However, cooling a hydrocarbon flow may create, among other problems, hydrate formation. Hydrate formation occurs because water usually forms part of the hydrocarbon flow, which water is enabled to be separated out as free water when cooling the flow. Hydrates may crystallize or compact, creating danger of blockages in tubing, flow lines or pipe lines. It is therefore important that the cooling unit is adapted to the specific use, as well as the amount and composition of the medium to be cooled.

It has proved difficult to arrange a cooler system that is flexible with regards to flow rate and temperature of the well flow.

An object of the invention is therefore to provide a cooling system that is flexible with regards to the cooling needs of a lifetime cycle of a well flow.

Another object is to make sure that the cooled flow stays within a predetermined temperature range.

SUMMARY OF THE INVENTION

The invention is set forth and characterized in the independent claim while the dependent claims describe other characteristics of the invention.

According to the invention a cooler system is provided having an inlet and an outlet, the cooler system comprising at least a first cooler and a second cooler arranged in a series connection, at least a third cooler which is arranged in parallel connection with the first cooler and second cooler, and at least one flow control device for directing flow through at least one cooler, wherein at least one of the coolers comprises a bypass circuit and/or recirculation loop. The recirculation loop allows additional cooling of at least parts of the well flow, alternatively the whole well flow, in situations where the flow is not satisfactory cooled. In addition, a bypass circuit it might be arranged over said first cooler and/or second cooler, which bypass circuit allows at least fractions of the flow, alternatively the whole flow, to bypass the cooler. This might be advantageous in occasions where cooling, e.g. additional cooling, are unnecessary or unwanted due to the temperature of the well flow, e.g. in that the temperature of the well flow may vary as a function of time, and/or that the flow rate of the well flow may vary during the lifetime of a field. The bypass circuit may form part of the recirculation loop, for instance by the use of three-way valves allowing either no flow, flow in a first direction, or flow in a second direction. Alternatively, the bypass circuit and recirculation loop may be formed by separate pipes, tubes or similar, bypassing the cooler or recirculating around or alternatively within the cooler. The third cooler, or any number of additional coolers, may be arranged in one or more parallel connections relative the first and second cooler. There may also be additional coolers in the series of the first and second coolers. In one embodiment the third cooler comprises a recirculation loop. In another embodiment the third cooler comprises a bypass circuit and/or a recirculation loop. But it should be understood that any of the first, second, third or any additional coolers can be arranged with a recirculation loop and/or bypass circuit. The third cooler can be arranged in a series connection with at least one other cooler. The different series connections, e.g. denoted a single branch, may have the same maximum cooling effect or different cooling effect. The cooling effect in one series connection, or branch, also depends on the expected flow rate of the well. The cooler system comprises at least one flow control device for directing a fluid flow through at least one of said first cooler and second cooler, third cooler and/or bypass line. The flow control device is preferably a valve or other means capable of directing the well flow. The system may be equipped with one, two, or a number of flow control devices directing the well flow through the desired coolers, bypass line or bypass circuits.

The cooler system may be provided with means for MEG-injection to prevent the formation of hydrates. The MEG-injection means might become usable both during standard operation of the cooler system under normal flow conditions, and when the flow is stopped etc.

It is possible to arrange a number of coolers or cooling units, such as the ones described in WO 2011008101 A1, to provide the cooler system according to the invention. WO 2011008101 A1 describes a subsea cooling unit comprising a first header pipe and a second header pipe having its longitudinal axis substantially parallel with and at a distance from the first header pipe. At least one set of cooler coils is arranged between the first and second header pipes. The at least one set is formed such that the coils are arranged in one plane. The first header pipe is adapted for communication with at least one hydrocarbon well and forms a common inlet for the subsea cooling unit. The second header pipe is adapted for communication with a flow line and forms a common outlet for the subsea cooling unit. Each set of cooler coils is individually connected to both of the header pipes. These header pipes are adapted to be connected to processing equipment subsea and form an inlet and outlet of the subsea cooling unit. The cooling unit may be used to cool a medium with, for instance, seawater. The medium to be cooled may then be guided within the header pipes and the coils to be cooled with seawater. The length of the flow path in a set of cooler coils may easily be adjusted. The number of sets of cooler coils may also easily be adjusted. This gives a cooling unit which easily may be adapted for the specific use and desired cooling effect needed at a specific location. By arranging the coils in one plane, several sets may easily be stacked next to another. This makes it easy to adjust the cooling effect by increasing or reducing the number of sets arranged between and in direct communication with both the header pipes and at the same time possibly adjusting the length of the header pipes to accommodate the needed number of sets of cooler coils. The cooling effect of one cooling unit may possibly also be altered during the lifetime of the cooling unit by having the header pipes configured such that they may receive additional sets of cooler coils during the lifetime of the cooling unit. The at least one set of cooler coils may form a serpentine configuration and may comprise at least three straight pipes and at least two 180 degrees bends, where the straight pipes and the bends are arranged to form continuous coils forming an internal flow path and two connectors, one at each end of the flow path, for connection of the set of cooler coils to the header pipes. The straight pipes and the bends are preferably prefabricated standard units. The assembly of the straight pipes and the bends will then form a serpentine flow path. By assembling a number of these one may adapt the set of cooler coils to the length necessary for the specific use, which gives great versatility of the cooling unit. The standardization of the elements forming the cooling unit also makes it inexpensive and easily adaptable.

A single cooler can be arranged as a unit having an inlet for the well flow in the upper part leading to a cooler coil. The cooler coil can have a number of straight pipes and bends leading to a well flow outlet, which outlet is arranged in a horizontal plane vertically lower than the horizontal plane of the inlet. The cooler may according to one aspect be provided with fluid-tight walls on each side and an opening in the lower part. Additionally, the cooler may be provided with first and second perforated plates at the upper end of the fluid-tight walls. Preferably, seawater enters from beneath the cooler and escapes through the upper part of the cooler. The first perforated plate and the second perforated plate may be provided with similar or different perforations. The first and second perforated plates can be movable relative to each other. The second perforated plate may be fixed relative to the fluid-tight walls of the cooler. The first perforated plate may be movable and arranged parallel to the second perforated plate. The movement of the first perforated plate may be conducted by means of an actuator. The actuator can be of a mechanical or electrical type, etc. By arranging one plate relatively movable to a second plate, it is possible to adjust the flow of seawater through the cooler, i.e. the flow area, by allowing more or less seawater to pass through the perforations. If the perforations of the two plates are coincident the flow area is at its maximum. By the use of this arrangement, the cooling of the well flow is driven by a controlled natural convection. It is also possible to use other means of flow adjustment different from perforated plates, such as different kinds of valves, plate valves, flaps or other means which may partially or fully limit the flow of seawater past the coils in the cooler unit, etc. Alternatively, a means for generating fluid motion, i.e. seawater, such as a pump, propulsion means, propeller or similar may be arranged to drive the seawater through the cooler. The well flow, having a high temperature, enters the coil and is exposed through the walls of the cooling coils to seawater that has been heated by the well flow in the lower part of the cooler. Therefore, the well flow experiences a gradual cooling, i.e. first it is exposed to heated seawater then it is exposed to cold seawater. The heated seawater will always tend to flow upwards in colder water, and if the cooler is open, allowing partial or full flow of seawater past, this will set up a natural flow of seawater past the cooler coils in the cooler. In an embodiment of the cooler system at least two of the coolers may have different cooling capacities. The cooling need may vary on the same field, and even in the same well flow as a function of time. By providing coolers with different or even equal cooling capacity, arranged in series and parallel and with bypass lines and regulation means for including or excluding flow through the different coolers, gives a large flexibility with regards to the desired cooling effect.

In an embodiment, the invention regards at least one cooler comprising an inlet and an outlet for a subsea flow, an inlet opening and an outlet opening for a cooling medium, wherein the outlet opening comprises fluid flow adjustment means for regulating the flow of cooling medium through the cooler. The flow adjustment means may be in the form of two or more perforated plates, the perforated plates being movable relative to each other, as explained above. Alternatively, the flow adjustment means may be valves, flaps or other means capable of adjusting the flow area, also explained above. A larger flow area gives a larger flow rate due to the natural convection, while a smaller flow area reduces the flow rate. It is possible to arrange two or more coolers in series or parallel.

If connecting additional wells to a cooler system, the cooling effect of the series connection can be adjusted to conform with the desired need of cooling for this additional well or wells. As different wells may have different composition, flow rate and temperature, one may direct the flow from one well to a first series connection of coolers, the flow from a second well to a second series connection of coolers etc. Alternatively, it is possible to mix the flows from separate wells, leading the mixed flow through the same series connection coolers.

In an embodiment the cooler system comprises a bypass line bypassing all of the coolers. The bypass line may be a separate bypass line arranged in parallel with the series connection of coolers, or bypass circuits on each cooler in one series connection. This makes it possible for the well flow to bypass all of the coolers, and may be advantageous in situations where there is no need of cooling or when maintenance work is performed on the coolers.

In an embodiment of the cooler system, the coolers may comprise temperature control means and might be configured to re-circulate at least parts of a fluid flow through the re-circulation loop if the temperature is above a threshold value. The system may also comprise other kinds of sensor means such as flow sensors, pressure sensors etc. The sensors can be arranged at different positions in the cooler system, e.g. one at each cooler, between the coolers, at the inlet of a cooler series etc. By reading the sensor values, an operator may monitor the cooler system and the coolers, and direct the flow into another set of coolers, re-circulate the whole flow or parts of the flow, bypassing the whole or parts of the flow through the bypass line or the bypass circuit, whatever is desirable.

The invention will now be described in non-limiting embodiments and with reference to the attached drawings, wherein;

DETAILED DESCRIPTION OF A PREFERENTIAL EMBODIMENT

Figure 1:
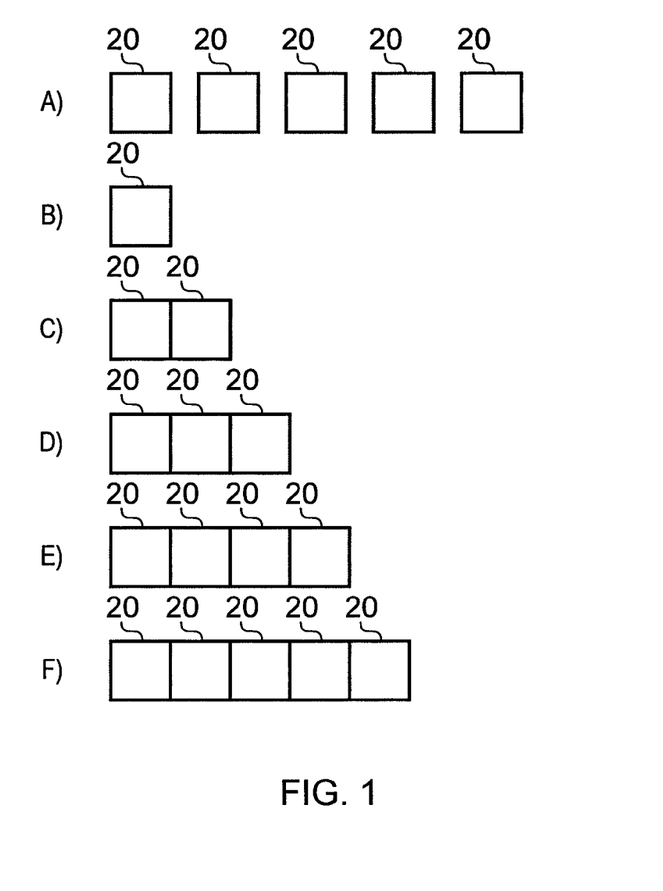
FIG. 1 shows examples of different cooler systems according to the invention, the systems A), B), C), D), E) comprising coolers of equal cooling capacity.

FIG. 1 shows examples of different cooler systems according to the invention. The systems A), B), C), D), E) comprise coolers 20 of equal cooling capacity. In the embodiment disclosed in A), five equal coolers having equal cooling capacity are shown. Embodiment B) shows a cooling system having one cooler 20. Embodiment C) shows a cooling system having two coolers 20 arranged in a series connection. Embodiments D), E) and F) show embodiments of cooler systems having three, four and five coolers 20, respectively.

Figure 2:
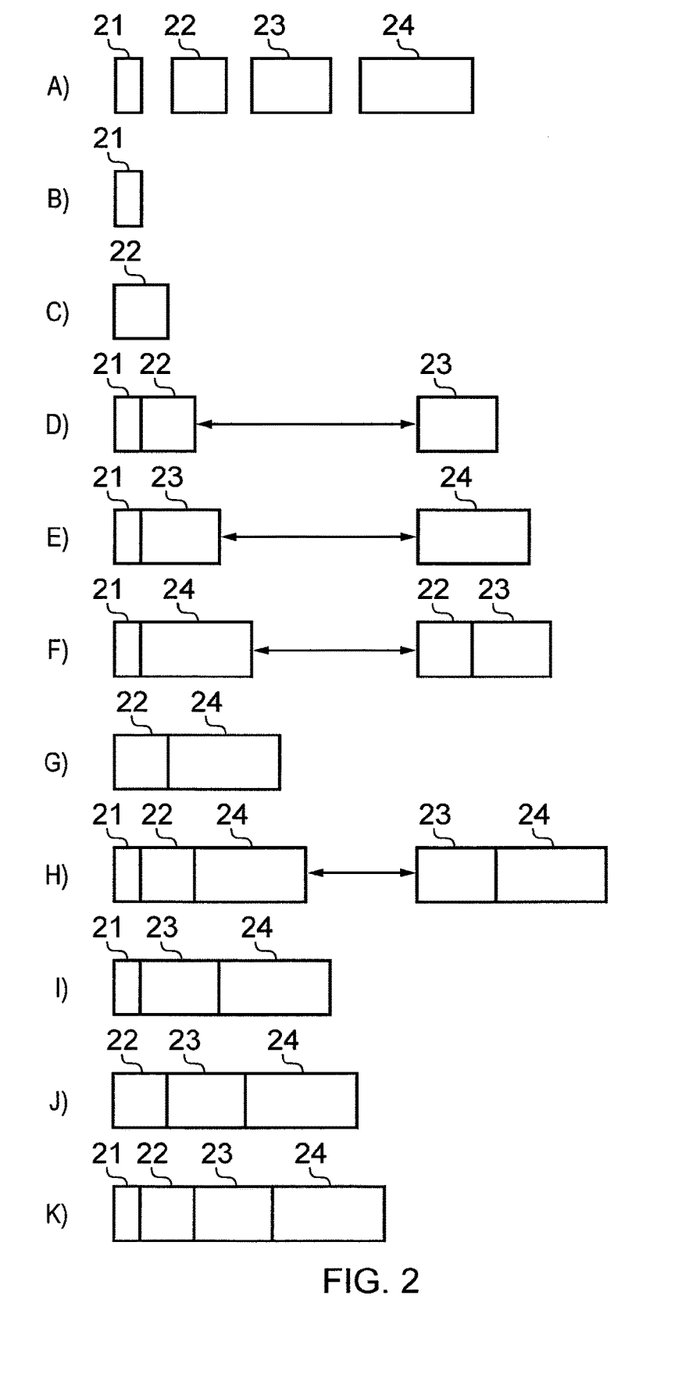
FIG. 2 shows examples of cooler systems comprising coolers of equal or different cooling capacities.

FIG. 2 illustrates examples of cooler systems comprising coolers of equal or different cooling capacities. In embodiment A) four different coolers 21, 22, 23, 24 are shown. The difference in size of the coolers 21, 22, 23, 24 is a graphical illustration to indicate a difference in cooling capacity. Cooler 21, also shown in embodiment B), is shown as the smallest of the coolers 21, 22, 23, 24, indicating that it has the lowest cooling capacity. Cooler 22, also shown in embodiment C), is larger than cooler 21, indicating that it has a larger cooling capacity than cooler 21. Similarly, coolers 23 and 24 are shown even larger than cooler 22, indicating that they have a larger cooling capacity than cooler 22. In the embodiment shown in D), an example of two different cooler systems is disclosed where the systems have equal cooling capacity. The system that consists of the two coolers 21, 22 is shown as having an equal size, hence equal cooling capacity, as the system that consists of one cooler 23. Similarly, in embodiment E), two cooler systems having equal cooling capacity are shown. One of the systems consists of cooler 21 and cooler 23, which corresponds to a cooler system that consists of one cooler 24. Embodiments F), G), H), I), J) and K) show different examples of cooler systems comprising two or more of the different coolers 21,22,23,24, respectively.

Figure 3A:
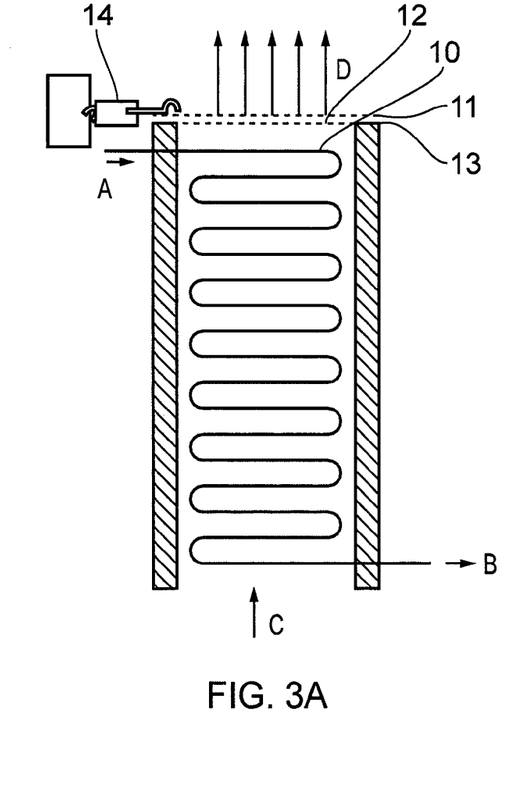
FIG. 3A shows a side-view of an embodiment of a single cooler according to the invention.

FIG. 3A shows an embodiment of a single cooler according to the invention. In the exemplified cooler, the cooler is arranged in a subsea environment. The well flow, i.e. hydrocarbon flow, enters the cooler coil 10 in the upper part. The inflow direction is shown by arrow A. The well flow exits the cooler in a lower part. The outflow direction out of the coil 10 in the cooler is shown by arrow B. Preferably, seawater enters from beneath the cooler (shown by arrow C in the figure) and escapes through the upper part of the cooler, shown by arrow D. On the upper end of the cooler a first perforated plate 11 and a second perforated plate 13 with perforations 12 are arranged. The second perforated plate 13 is connected to the walls of the cooler. The first perforated plate 11 is movable and is arranged in a parallel plane relative the second perforated plate 13. The movement of the first perforated plate 11 is for example conducted by means of an actuator 14, which actuator 14 is typically of a mechanical or electrical type, etc. By arranging the first perforated plate 11 movable relative to the second perforated plate 13, it is possible to adjust the flow of seawater through the cooler, as the cooling of the well flow is driven by natural convection. The well flow, having a high temperature, enters the coil 10 in the cooler at arrow A and is heat-exchanged with seawater that has already been heated by the well flow in the lower part of the cooler. Therefore, the well flow experiences a graduated cooling, i.e. first it is exposed to heated seawater, then it is exposed to cold seawater. The heated seawater will move within the cooler, in this case rises. Due to the convection, the heated seawater travels to a relatively colder area.

Figure 3B:
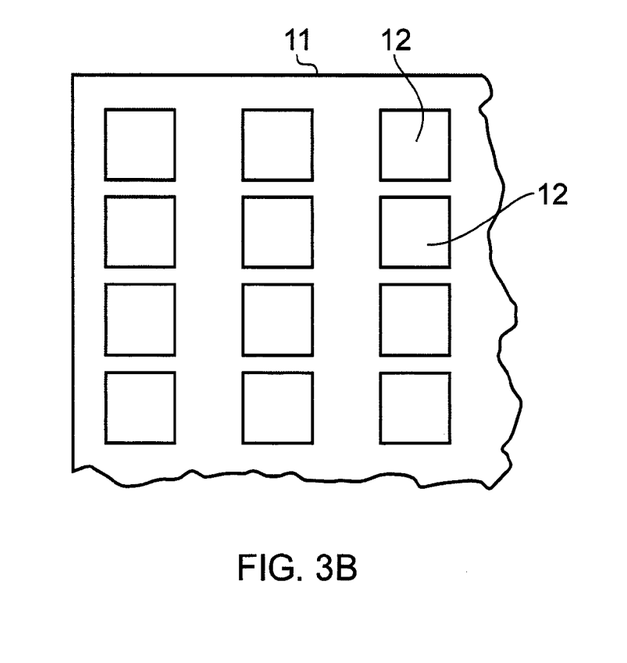
FIG. 3B shows a top view of a perforated plate of a single cooler.

FIG. 3B shows a top view of an example of the configuration of the first perforated plate 11 being provided with perforations 12. A movement of the first perforated plate 11 relative to the second perforated plate 13 controls the flow area through the perforations of the first and second perforated plates, i.e. the convective flow rate of seawater flowing through the cooler.

Figure 4:
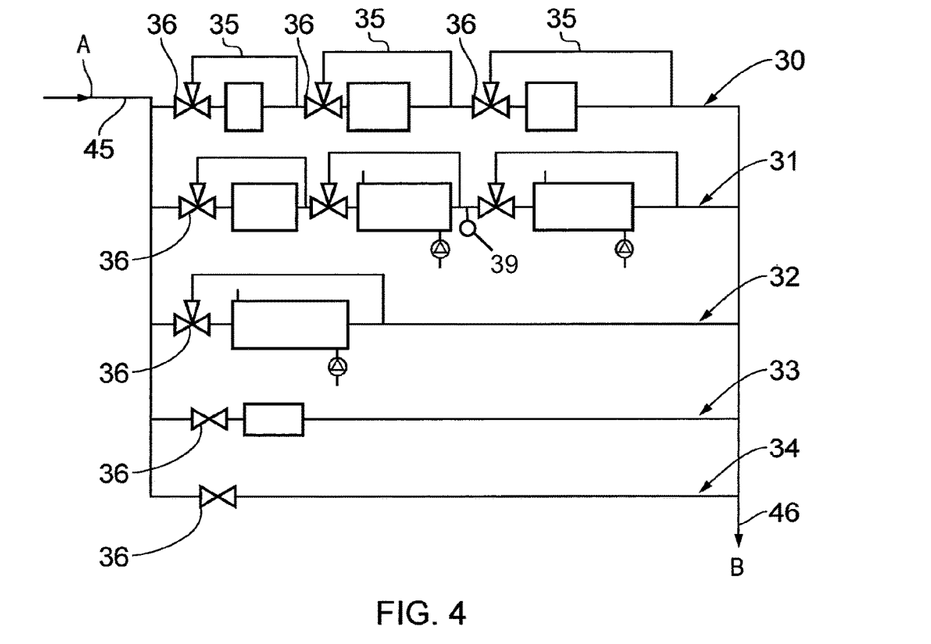
FIG. 4 shows a first embodiment of a cooler system comprising five parallel cooler series, where some of the coolers are provided with a recirculation loop.

FIG. 4 shows a first embodiment of a cooling system according to the invention. The well flow enters the cooler system through inlet pipe 45. The flow direction is shown by arrow A. The flow exits the cooler system through outlet pipe 46. The flow direction is shown by arrow B. In the figure five branches 30, 31, 32, 33, 34 are shown, where the branches are all arranged in parallel with each other. At the inlet of each of the connection series 30, 31, 32, 33, 34 a flow control device 36 is arranged for controlling the inflow into each branch, and into each cooler. The flow control device 36 is typically a three-way valve or other means capable of directing a well flow. The cooling system may also comprise temperature control means, an example of which is the temperature sensor 39 depicted in FIG. 4. Additionally, other sensor means such as flow sensors, pressure sensors, etc. may be used. The sensors can be arranged at different positions in the cooler system, e.g. one at each cooler, between the coolers, at the inlet of a cooler series, etc. Dependent on required cooling capacity, the flow control means 36 arranged at each inlet of a connection series may direct the flow into one or more of the different series connections. In the exemplified embodiment, series connection 31 is the cooling series that has the largest cooling capacity of the shown series connections, while series connection 33 has the lowest cooling capacity if excluding series connection 34. Connection 34 is a bypass line, allowing the flow to flow through the cooler system to bypass all of the coolers.

Figure 5:
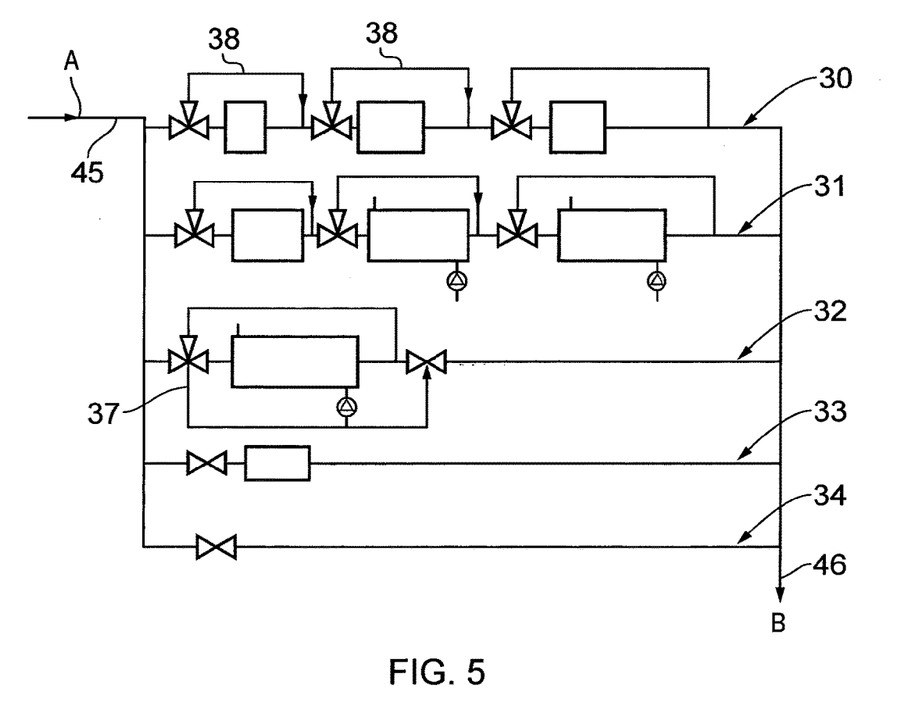
FIG. 5 shows a second embodiment of a cooler system, where some of the coolers are provided with a recirculation loop and a bypass loop.

FIG. 5 shows a second embodiment of the cooler system according to the invention. In connection with each cooler, in addition to a recirculation loop 35 (FIG. 4), a bypass circuit 37, 38 may be arranged for bypassing at least parts of a fluid flow if, for instance, the temperature is above a threshold value. The bypass circuit 37, 38 may be in the form of a one-way flow loop as shown by reference numeral 37 or a two-way flow loop as shown by reference numeral 38. The system may in addition include all the features of the embodiment disclosed in FIG. 4.

The cooler system according to the invention provides large flexibility with regards to the cooling requirement. Being able to provide a cooler system having different cooling capacities dependent on the cooling need, is advantageous bearing in mind that the hydrate formation temperature and/or flow rates may vary during the lifetime of a field. By selecting coolers having equal or different cooling capacity, arranging two or more coolers in series, providing a recirculation loop that recycles at least an amount of the flow if the temperature is above a predetermined level on one or more of said coolers, providing a bypass circuit on one or more of the coolers, providing a bypass line bypassing all of the coolers if there is not a need for cooling, or arranging two or more coolers in parallel connection, give a large flexibility in terms of cooling a well flow.

The invention is herein described in non-limiting embodiments. A skilled person in the art will understand that there may be made alterations and modifications to the embodiments that are within the scope of the invention as defined in the attached claims, and elements or features of the different embodiments may be combined in any configuration.

The invention claimed is:

1. A cooler system having an inlet and an outlet, the cooler system comprising:
   at least first and second coolers which are fluidly connected in series;
   at least a third cooler which is fluidly connected in parallel with the at least first and second coolers;
   at least one flow control device for directing a fluid flow through at least one of the at least first, second and third coolers;
   and, at least one of a bypass circuit and a recirculation loop which is fluidly connected with at least one of the at least first, second and third coolers.

2. The cooler system according to claim 1, wherein at least two of the at least first, second and third coolers have different cooling capacities from each other.

3. The cooler system according to claim 1, further comprising a bypass line bypassing all of the at least first, second and third coolers.

4. The cooler system according to claim 3, wherein the at least one flow control device directs the fluid flow through at least one of the at least first, second and third coolers or the bypass line.

5. The cooler system according to claim 1, wherein the third cooler is fluidly connected in a series with at least a fourth cooler.

6. The cooler system according to claim 1, wherein at least one of the at least first, second and third coolers comprises a temperature sensor and is configured to recirculate at least part of the fluid flow through the recirculation loop if a temperature of the fluid flow is above a threshold value.

7. A cooler system for cooling a fluid, the cooler system comprising:
   a first fluid branch which comprises at least first and second coolers fluidly connected in series;
   a second fluid branch which comprises at least a third cooler, the second branch fluidly connected in parallel with the first branch; and
   a flow control device for controlling a flow of the fluid through at least one of the at least first, second and third coolers;
   and, at least one of a bypass circuit and a recirculation loop which is fluidly connected with at least one of the at least first, second and third coolers for bypassing the fluid around or recirculating the fluid through said at least one first, second and third coolers.

8. The cooler system according to claim 7, wherein at least two of the at least first, second and third coolers have different cooling capacities from each other.

9. The cooler system according to claim 7, further comprising a third fluid branch which is fluidly connected in parallel with the first and second fluid branches, the third fluid branch comprising a bypass line for bypassing all of the at least first, second and third coolers.

10. The cooler system according to claim 7, wherein the second fluid branch comprises at least a fourth cooler which is fluidly connected in series with the third cooler.

11. The cooler system according to claim 7, wherein at least one of the at least first, second and third coolers comprises a temperature sensor and a recirculation loop, and wherein a flow control device is configured to recirculate at least part of the fluid flow through the recirculation loop if a temperature of the fluid in said at least one cooler is above a threshold value.

* * * * *